United States Patent [19]

Dunckley et al.

[11] Patent Number: 5,724,209
[45] Date of Patent: Mar. 3, 1998

[54] LOW-PROFILE DISK MOUNTING ASSEMBLY, AND LOW-PROFILE DISK DRIVES CONSTRUCTED THEREFROM

[75] Inventors: James A. Dunckley, Boulder; Gary F. Kelsic, Longmont, both of Colo.

[73] Assignee: Integral Peripherals, Inc., Boulder, Colo.

[21] Appl. No.: 772,379

[22] Filed: Dec. 23, 1996

Related U.S. Application Data

[63] Continuation of Ser. No. 391,872, Feb. 22, 1995, abandoned.

[51] Int. Cl.$^6$ ............................................. G11B 17/028
[52] U.S. Cl. .............................. 360/98.08; 360/99.05; 360/99.12; 369/270
[58] Field of Search .................... 360/97.01, 98.01, 360/98.02, 98.07, 98.08, 99.01, 99.04, 99.05, 99.08, 99.12; 369/270, 271; 310/67 R

[56] References Cited

U.S. PATENT DOCUMENTS

| | | | |
|---|---|---|---|
| 3,984,873 | 10/1976 | Pejcha | 360/105 |
| 4,535,374 | 8/1985 | Anderson et al. | 360/103 |
| 4,663,682 | 5/1987 | McNeil | 360/105 |
| 4,752,848 | 6/1988 | Garcia et al. | 360/105 |
| 4,827,470 | 5/1989 | Odawara et al. | 369/271 X |
| 4,870,703 | 9/1989 | Augeri et al. | 360/98.07 |
| 4,933,785 | 6/1990 | Morehouse et al. | 360/78.04 |
| 5,027,241 | 6/1991 | Hatch et al. | 360/105 |
| 5,101,306 | 3/1992 | Johnson | 369/270 |
| 5,181,148 | 1/1993 | Blanchette et al. | 360/99.08 |
| 5,214,636 | 5/1993 | Ishikawa et al. | 369/286 |
| 5,237,472 | 8/1993 | Morehouse et al. | 360/105 |
| 5,270,999 | 12/1993 | Chessman et al. | 369/271 |
| 5,289,325 | 2/1994 | Morehouse et al. | 360/105 |
| 5,412,522 | 5/1995 | Lockhart et al. | 360/99.08 |
| 5,434,730 | 7/1995 | Shishido | 360/99.08 |

FOREIGN PATENT DOCUMENTS

| | | | |
|---|---|---|---|
| 6-195746 | 7/1994 | Japan | 369/286 |
| 7-235083 | 9/1995 | Japan. | |

OTHER PUBLICATIONS

"Prairie 120" PrairieTek Corporation publication, ©1989.

*Primary Examiner*—Stuart S. Levy
*Assistant Examiner*—William R. Korzuch
*Attorney, Agent, or Firm*—Skjerven, Morrill, MacPherson, Franklin & Friel

[57] ABSTRACT

An assembly for mounting a disk in a disk drive and including the disk mounting assembly. The disk mounting assembly includes a hub having a plurality of spoke recesses situated in the upper surface of the hub. The hub includes a protruding ledge for supporting a disk. A disk clamping ring adapted to fit about the hub is utilized. The disk mounting assembly also includes a spring washer having a circumferential edge surface adapted to contact the ring, the spring washer including a plurality of spokes extending inwardly from the circumferential edge surface of the washer to the center of the washer. A retainer is used to hold the center of the spring washer to the hub to squeeze a disk between the protruding ledge of the hub and the ring. The spokes of the spring washer are situated within respective spoke recesses of the hub to provide a low profile disk drive with more vertical room available for stator windings.

33 Claims, 6 Drawing Sheets

LOW-PROFILE DISK MOUNTING ASSEMBLY, AND LOW-PROFILE DISK DRIVES CONSTRUCTED THEREFROM

This application is a continuation of application Ser. No. 08/391,872, filed Feb. 22, 1995, now abandoned.

CROSS REFERENCE TO RELATED PATENT APPLICATIONS

This patent application is related to the copending patent application entitled "AIR BEARING SLIDER AND HEAD GIMBAL ASSEMBLY", by Bruce Emo et al., Ser. No. 08/271,398, filed 7/6/94 and assigned to the same assignee, the disclosure thereof being incorporated herein by reference.

This patent application is also related to the copending patent application entitled "DYNAMIC HEAD LOADING DISK DRIVE WITH SUPER-FINISHED DISK SURFACE", by Bruce Emo et al., Ser. No. 08/392,453 filed Feb. 22, 1995 and assigned to the same assignee, the disclosure thereof being incorporated herein by reference.

This patent application is also related to the copending patent application entitled "DISK DRIVE INCLUDING A SUBSTANTIALLY MONOLITHIC STATOR ASSEMBLY FABRICATED FROM LOW LOSS MAGNETIC MATERIAL" by Gary F. Kelsic, Ser. No. 08/342,452 filed Feb. 22, 1995 and assigned to the same assignee, the disclosure thereof being incorporated herein by reference.

BACKGROUND OF THE INVENTION

1. Field of the Invention

This invention relates in general to magnetic storage devices and, more particularly, to low profile disk drive devices.

2. Description of Related Art

As the size of computers grows continually more compact, it has become important to find ways to reduce the size of computer components such as disk drives. While significant progress has been made with respect to increasing the recording density of disk drives, reducing the height or thickness of disk drives has proven to be a particularly difficult problem. The use of thinner heads and thinner disks has permitted some reduction of drive height; however, the spindle, disk hub, disk clamp and motor of the drive have become limiting factors to further progress in drive height reduction.

Figure 1:
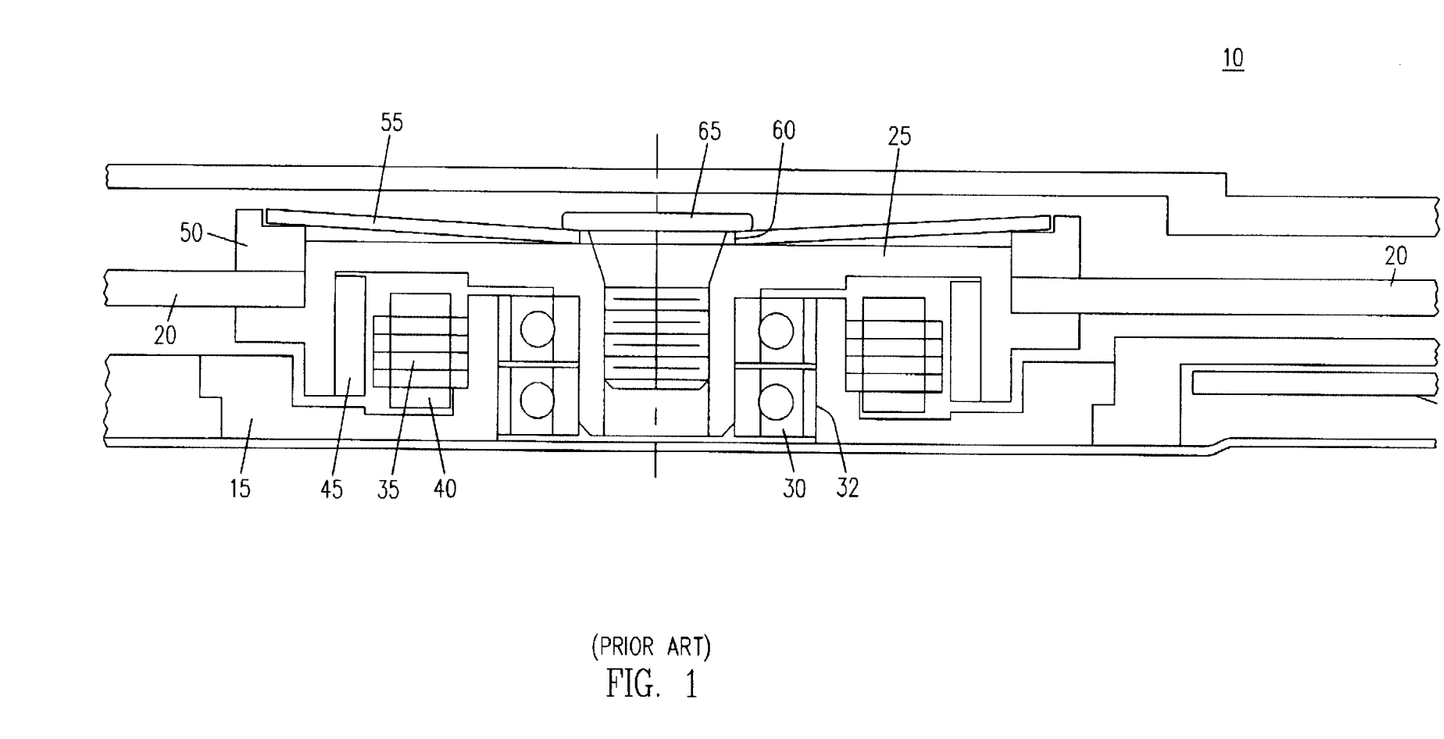
FIG. 1 is a cross section of a conventional disk drive showing a typical disk mounting assembly.

An example of a conventional disk drive 10 is shown in cross section in FIG. 1. Disk drive 10 is an "in-hub" design in which the motor is formed within the hub of the disk drive. More particularly, disk drive 10 includes a base plate 15. A disk 20 is mechanically coupled to a hub 25 which is rotatably supported by a bearing 30 between hub 25 and central bore 32 of base plate 15. A laminated stator 35 includes a stator winding 40 which interacts with magnets 45 to provide spinning force or torque to hub 25 and disk 20.

A disk clamp ring 50 is situated at the inner periphery of disk 20 so that the inner periphery of disk 20 is sandwiched between disk clamp ring 50 and hub 25. A clamp spring washer 55 including a central opening 60 is situated atop disk clamp ring 50. A clamp screw 65 passes through opening 60 and into hub 25. Clamp screw 65 compresses clamp spring washer 55 to hold disk 20 between clamp ring 50 and hub 25. In this arrangement, clamp screw 65, spring washer 55 and clamp ring 50 all extend above the uppermost surface of hub 25, thus limiting the height of the stator.

In such an "in-hub" design, the maximum radius permitted the stator is determined by the inner diameter of the disk. The radial dimension of the motor is thus fixed by the inner diameter of the disk. If the motor is reduced in size in the axial direction or thickness, there is typically less volume available for windings and magnetic core material. This tends to reduce the available motor torque and undesirably increases the motor spin-up time. Under certain conditions, this could cause the disk drive motor to stall. It is very desirable in modern, compact disk dives, such as Personal Computer Memory Card international Association (PCMCIA) drives, to provide a low vertical or axial profile.

SUMMARY OF THE INVENTION

One advantage of the disk drive of the present invention is a low profile. Another advantage of the disk drive of the present invention is an overall low vertical or axial profile which also permits a vertically taller stator winding. Providing for a taller stator winding in this manner permits an increase in the torque of the disk drive motor torque without increasing the vertical dimension of the disk drive.

In accordance with one embodiment of the present invention, a disk mounting assembly is provided which includes a hub having an upper surface with a plurality of spoke recesses situated therein. A protruding ledge extends around the hub. The assembly also includes a disk having a central opening which is situated on the protruding ledge and about the hub. The assembly further includes a ring which is situated about the hub and atop the disk. The disk mounting assembly includes a spring washer having a circumferential edge surface situated atop the ring, the spring washer including a center and a plurality of spokes extending inwardly from the circumferential edge surface toward the center of the washer. The plurality of spokes of the spring washer are situated within the plurality of spoke recesses of the hub, respectively. The disk mounting assembly further includes a retainer for holding the center of the spring washer to the hub to squeeze the disk between the protruding ledge of the hub and the ring. In this particular embodiment, the spring washer and retainer are advantageously situated below the upper surface of the hub. This feature desirably permits the fabrication of a disk drive which provides more vertical room for stator windings.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 2:
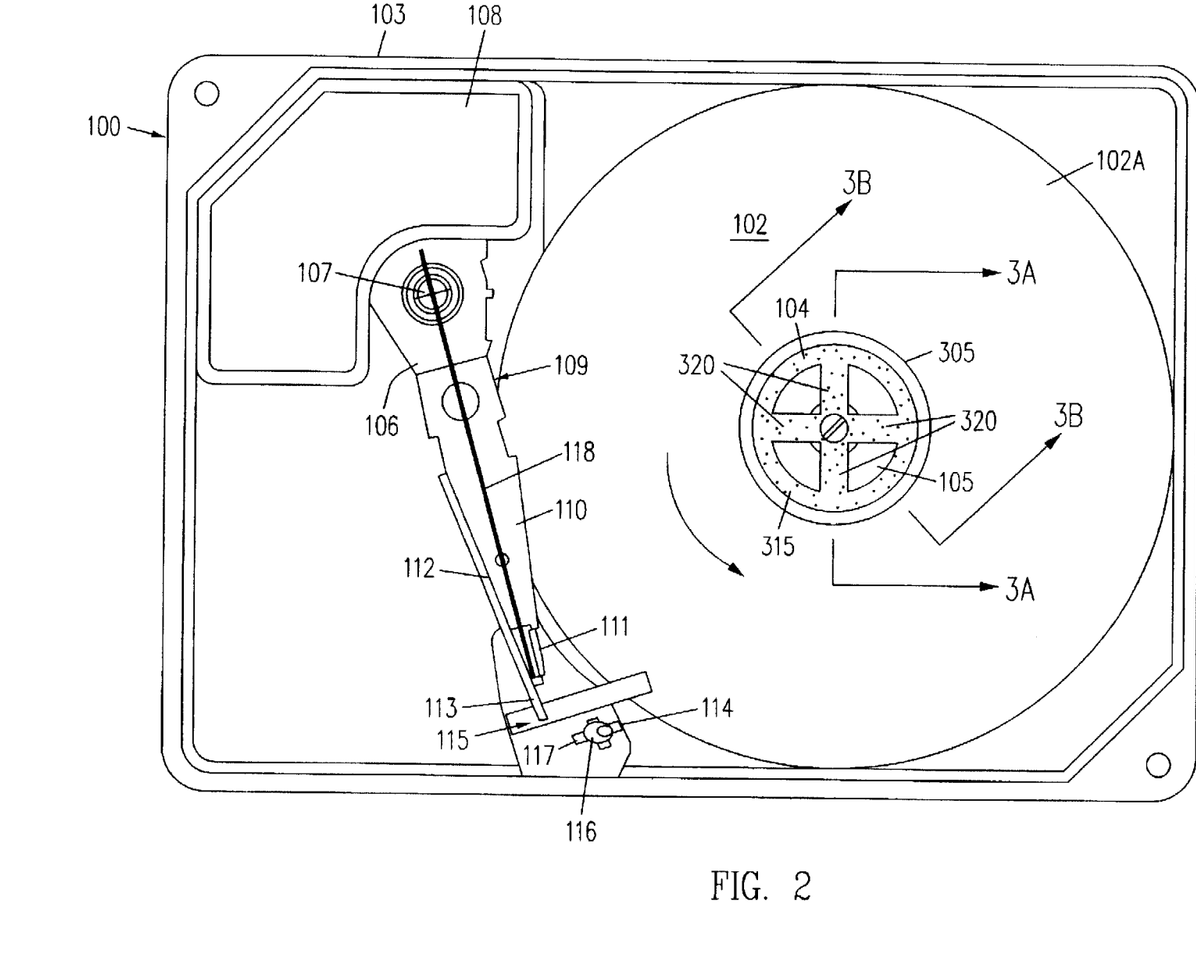
FIG. 2 is a top plan view of one embodiment of the disclosed disk drive with the cover removed.

FIG. 2 shows a top plan view of one embodiment of a disk drive 100 which is highly enlarged for illustration purposes. Disk drive 100 includes a disk clamping assembly, described later in more detail, which permits vertically taller stator windings while maintaining a relatively low vertical profile for the drive.

Disk drive 100 includes a rigid disk 102 having magnetic surface coatings 102A and 102B on the opposed surfaces thereof to permit recording and playback of digital information. While disk 102 is shown as being a magnetic disk, disk 102 can also be an optical disk, CD ROM or other rigid media disk which requires a rotatable mounting arrangement. Disk 102 is rotatably supported by a motor and spindle assembly shown in cross section in FIG. 3A. Returning to FIG. 2, a disk clamp spring washer 104 secures disk 102 to hub 105 of the motor to permit disk 102 to spin or rotate with the rotor portion of the motor. Disk 102, disk clamp spring washer 104 and hub 105 cooperate to form the disk clamping assembly of the disk drive which will be discussed later in more detail.

Disk drive 100 includes a rotary actuator having an actuator body 106 which rotates about a center of rotation 107. A suitable coil and permanent magnet motor (not shown) are positioned beneath a return plate 108 to rotate the position of actuator body 106. Drive mechanisms other than a permanent magnet motor may be used as well to rotatably position actuator body 106.

A head gimbal assembly 109 or suspension is attached to actuator body 106 such that assembly 109 rotates about center of rotation 107. Head gimbal assembly 109 forms an elongated actuator arm which includes a generally flat, triangularly shaped load beam 110 the centerline of which is indicated by reference character 118 which supports a slider body 111 near the free end of the load beam. Slider body 111 includes a read/write element or head for writing information to and reading information from magnetic recording disk 102. To increase the storage capacity of the disk drive, a second head gimbal assembly may be optionally installed beneath disk 102 to provide for recording and playback of data on the lower surface of disk 102. To further increase the ultimate storage capacity of the disk drive, one or more disk—head gimbal —actuator assemblies may be stacked below the disk—head gimbal—actuator assembly depicted in FIG. 2. Head gimbal assembly 109 includes a lift tab 112, such as a rod for example, which is suitably attached to the upper surface of load beam 110. Alternatively, lift tab 112 can be formed integrally with load beam 110.

A cam assembly 114 is supported on baseplate 103 such that cam assembly 114 is in operative relationship with the free end 113 of lift tab 112. Cam assembly 114 includes a cam surface 115. Load beam 110 of head gimbal assembly 109 provides a downward force (when viewed as illustrated in FIG. 2) which maintains free end 113 of lift tab 112 in contact with cam surface 115. As seen in FIG. 2, a portion of cam surface 115 extends over the upper surface of disk 102. Cam assembly 114 is attached to baseplate 103 by a suitable fastener such as a bolt 116 having a threaded end (not shown) which cooperates with a threaded opening (not shown) in baseplate 103. As seen in FIG. 2, cross-shaped slot 117 permits adjustment of the position of cam assembly 114 on baseplate 103.

Cam surface 115 cooperates with lift tab 112 of load beam 110 to provide the load beam and head element with a resting place laterally spaced apart from the disk when the drive is powered down. Cam surface 115 also provides a mechanism for lifting load beam 110 and the head element thereon to a flying position above disk 102 after the drive is powered up and disk 102 is spinning at operational speed. More detail with respect to this lifting mechanism is found in the copending patent application entitled "DYNAMIC HEAD LOADING DISK DRIVE WITH SUPER-FINISHED DISK SURFACE", Ser. No. 08/392,453, filed Feb. 22, 1995, by Bruce Emo et al., the disclosure thereof being incorporated herein by reference, and in U.S. Pat. No. 5,289,325 entitled "RIGID DISK DRIVE WITH DYNAMIC HEAD LOADING APPARATUS", by James H. Morehouse et al., issued Feb. 22, 1994, the disclosure thereof being incorporated herein by reference, and in U.S. Pat. No. 5,237,472 entitled "RIGID DISK DRIVE WITH DYNAMIC HEAD LOADING APPARATUS", by James H. Morehouse et al., issued Aug. 17, 1993, the disclosure thereof being incorporated herein by reference. One suspension which can be used as head gimbal assembly 109 is the suspension of the copending patent application entitled "AIR BEARING SLIDER AND HEAD GIMBAL ASSEMBLY", by Bruce Emo et al., Ser. No. 08/271,398, filed 7/6/94 and assigned to the same assignee, the disclosure thereof being incorporated herein by reference.

Returning now to FIG. 3A, the mechanical layout of the motor assembly and disk mounting assembly of disk drive 100 of FIG. 2 is illustrated in cross section. A central base member 200 is held in fixed position within base plate 103. Base member 200 includes a central tower 205 having a central bore 210. Disk drive 100 includes a substantially circular hub 105 for supporting disk 102. Disk 102 includes an upper magnetic layer 102A, a lower magnetic layer 102B and a central opening 230 having an inner diameter of approximately 12 mm, in this particular embodiment. Hub 105 includes a circular outer surface 335 on which the inner diameter of central opening 230 of disk 102 rests. More specifically, the lower surface of disk 102 rests on a protruding ledge 240 of hub 105.

Figure 3A:
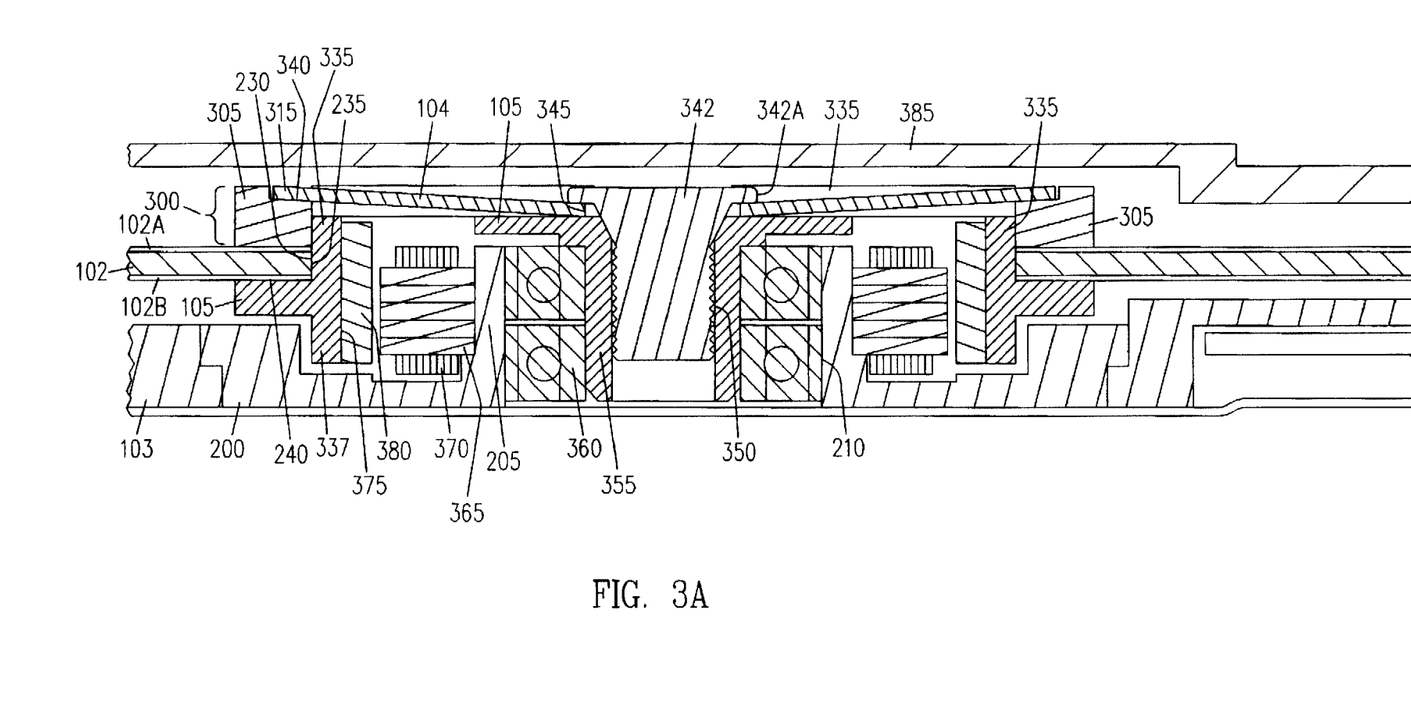
FIG. 3A is a cross section of the disk drive of FIG. 2 taken along section line 3A—3A.

Disk drive 100 includes a disk mounting apparatus 300 which is now discussed in more detail. The purpose of disk mounting apparatus 300 is to hold disk 102 to hub 105 in such a manner that the vertical space available for containing stator windings is increased without increasing the vertical dimension of the hub. Disk mounting apparatus 300 includes disk clamp ring 305, disk clamp spring washer 104 and hub 105. In this particular embodiment, neither the disk clamp ring 305 nor the spring washer 104 extend significantly above hub upper surface 310.

Figure 3B:
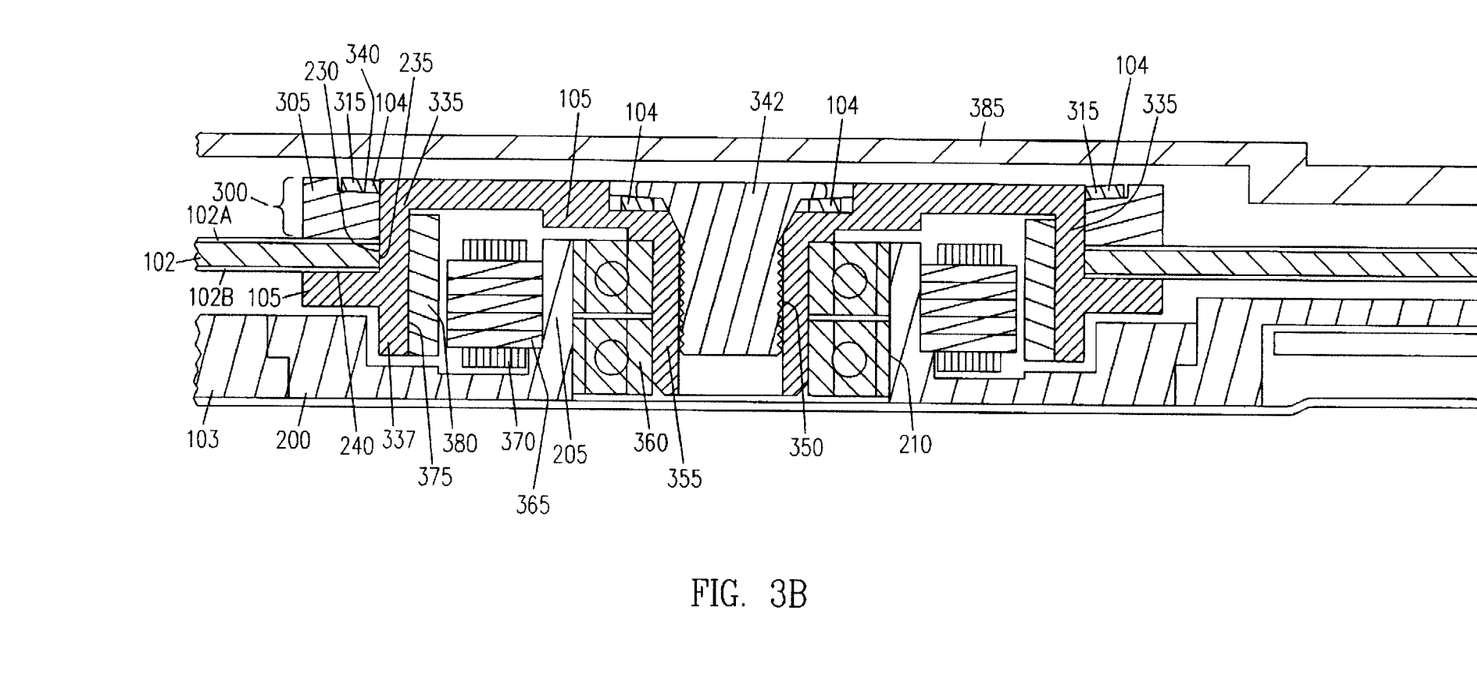
FIG. 3B is a cross section of the disk drive of FIG. 2 taken along section line 3B—13B.

FIG. 3B is a cross sectional view of disk drive 100 of FIG. 2 taken along section line 3B—3B.

Figure 4:
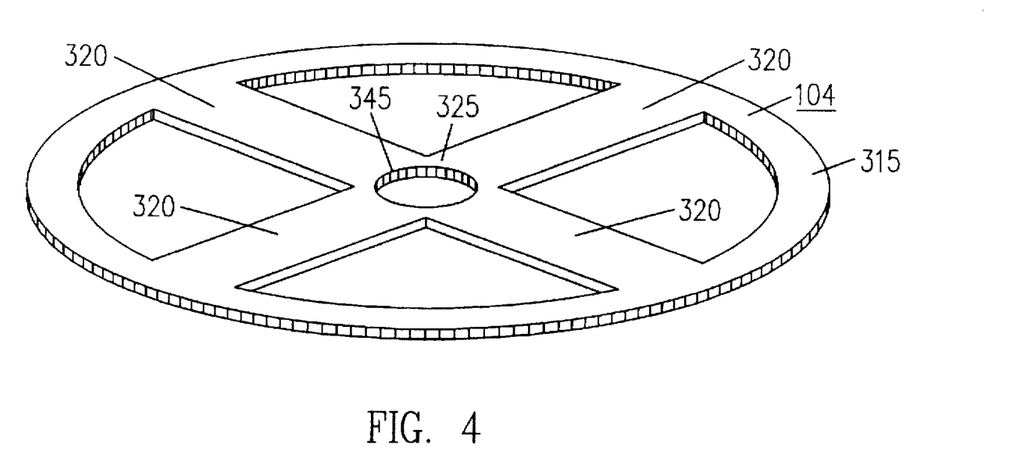
FIG. 4 is a perspective view of a spring washer employed by the disclosed disk drive.
Figure 5:
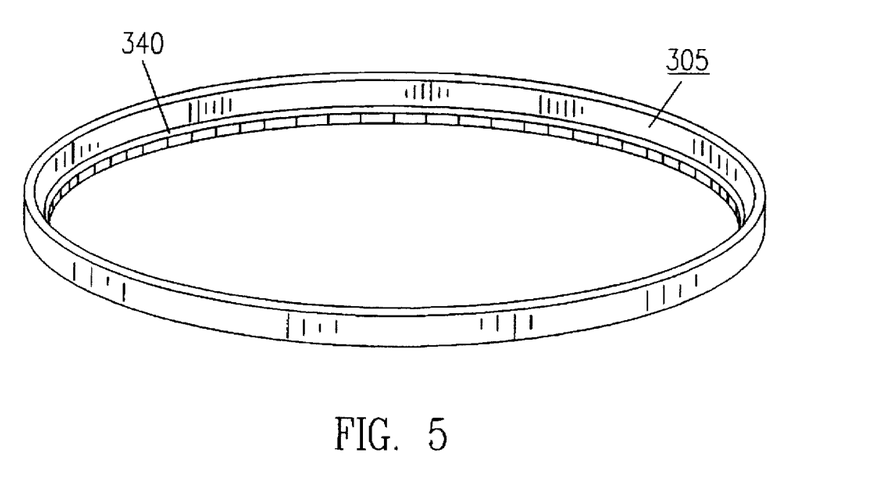
FIG. 5 is a perspective view of a disk clamp ring employed by the disclosed disk drive.

FIG. 4 is a perspective view of disk clamp spring washer 104. Spring washer 104 includes an outer ring 315 from which a plurality of spokes 320 extend inwardly toward the center 325 of washer 104. A central hole or opening 345 is situated at the center 325 of spring washer 104 where spokes 320 meet. FIG. 5 shows disk clamp ring 305 which is situated between outer ring 315 of spring washer 104 and ledge 240 of hub 105 as shown in FIG. 3.

Figure 6:
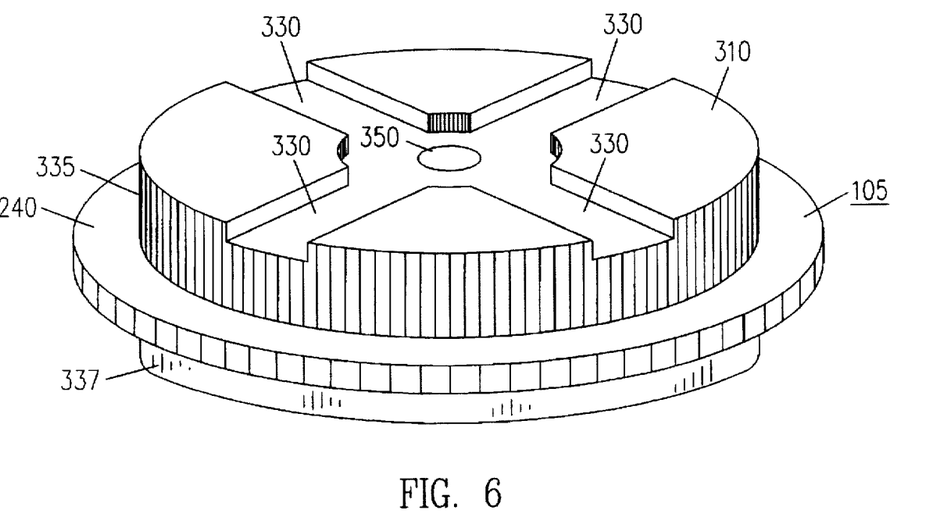
FIG. 6 is a top perspective view of a hub employed by the disclosed disk drive.
Figure 7:
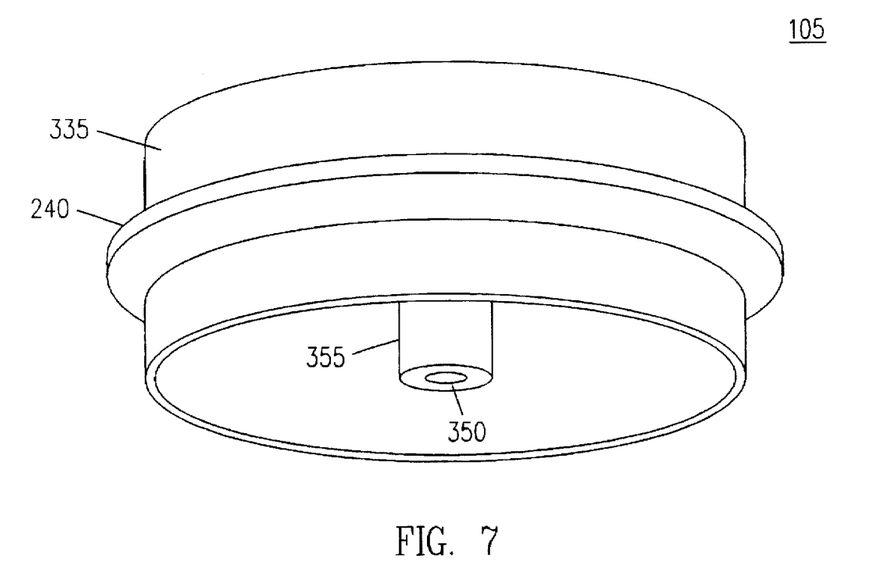
FIG. 7 is a bottom perspective view of a hub employed by the disclosed disk drive.

FIG. 6 is a perspective view of hub 105. A plurality of radial grooves or slots 330 are situated in hub upper surface 310. Slots 330 are also described as spoke recesses in that these slots form spoke-like recesses in the upper surface of hub 105. Adjacent slots 330 are orthogonal. Slots 330 are positioned in hub 105 to mate with corresponding spokes 320 of spring washer 104 on a one to one basis. In one embodiment, spokes 320 are situated completely within respective slots 330. In this manner, compressive force is imparted to clamp ring 305 to hold disk 102 in position on hub ledge 240 without the need for spring washer 104 to extend above hub upper surface 310.

In the particular embodiment illustrated in FIG. 4, spring washer 104 includes four spokes and hub 105 correspondingly includes four respective slots. The spokes are substantially orthogonal. It will be appreciated that a greater or lesser number of spokes and respective slots may also be employed as long as the resultant hub and spring washer structures have sufficient structural integrity to perform their respective tasks.

More detail is now provided with respect to assembling disk mounting apparatus 300. To assemble disk clamping apparatus 300, the inner periphery of disk 102 is situated on hub ledge 240 as shown in FIG.'s 3A and 3B. Disk clamp ring 305 is then positioned atop the inner periphery of disk 102 and around the hub main body 335 above hub ledge 240. The hub lower body 337 is the portion of hub 105 below hub ledge 240. It is noted that the inner surface of disk clamp ring 305 includes an annular groove 340 such that clamp ring 305 exhibits a substantially L-shaped cross section. Spring washer 104 is then positioned on hub 105 and atop disk clamp ring 305 such that spokes 320 of spring washer 104 are situated in respective slots 330 of hub 105. (Refer momentarily to FIG. 4 and FIG. 6.)

A screw 342 is then inserted through a central opening 345 in spring washer 104 and screwed into a threaded hole 350 in the center of hub 105. In one embodiment, the height of screw head 342A is selected to be equal to or less than the deflection of spring washer 104 when washer 104 is screwed into position as illustrated. For example, in the embodiment of FIG. 3A, the height of screw head 342A is approximately 0.25 mm and the vertical deflection of spring washer 104 is approximately 0.3 mm. The uppermost portion of hole 350 is bevelled as shown in FIG. 3A to receive a corresponding bevelled surface of screw 342. The center portion of hub 105 forms a spindle 355. When screw 342 is tightened, spring washer 104 compresses to provide a downward force on disk clamp ring 305 and disk 102. In this manner, disk 102 is fixedly held in position on annular protruding ledge 240 of hub 105.

While spring washer 104 is initially flat as shown in FIG. 4 when screw 342 is in the untightened state, spring washer 104 dishes downward as screw 342 is tightened. More particularly, screw 342 is tightened with an amount of torque sufficient to bottom out the center of spring washer 104 on hub 105 as shown in FIG. 3A. For example, screw 342 is tightened to provide 10 in-lbs (45 Newtons) of axial force in one particular example. This produces a clamping force on approximately 20 in-lbs. (90 Newtons) on disk 102 which is captured between disk clamp ring 305 and protruding ledge 240 of hub 105. In more detail, when screw 104 is tightened, spokes 320 dish or bend downward within respective slots 330 until spring washer 104 bottoms out. Slots 330 of hub 105 act as spoke recesses for receiving respective spokes 320 of spring washer 104. In this manner, the dishing action or deflection of spring washer 104 occurs substantially within hub 105 and thus does not contribute to the vertical profile of the drive. A low vertical profile disk drive with more vertical room for stator windings is thus made possible.

An annular bearing 360 is situated between spindle 355 and central bore 210 of tower 205 as shown in FIG. 3. In other words, bearing 360 sits within bore 210 and spindle 355 of hub 105 sits within bearing 360. In this manner, hub 105 and disk 102 are free to rotate about tower 205. An annular stator 365 including a plurality of angularly spaced apart stator windings 370 or poles is coaxially situated about tower 205. For example, 9 stator windings or poles are found to produce acceptable results. In this particular embodiment, the stator windings 370 exhibit a vertical dimension of approximately 3 mm, although it should be understood that this dimension will vary according to the particular application. Hub 105 includes an inner cylindrical surface 375 about which a plurality of angularly spaced apart permanent magnets 380 are situated. The number of magnets 380 is equal to 4/3 the number of poles of the stator winding 370 in this embodiment. When electric current is supplied to the stator windings 370, magnetic fields are generated which interact with the magnetic fields of permanent magnets 380 to causes hub 105 and disk 102 to rotate.

One stator which can be employed as the stator of disk drive 100 is described and claimed in the copending patent application entitled "DISK DRIVE INCLUDING A SUBSTANTIALLY MONOLITHIC STATOR ASSEMBLY FABRICATED FROM LOW LOSS MAGNETIC MATERIAL". by Gary F. Kelsic, filed Ser. No. 08/392,452 concurrently herewith and assigned to the same assignee, the disclosure thereof being incorporated herein by reference.

In this particular embodiment, the rotor of drive 100 is formed by hub 105, magnets 380, disk 102, spring washer 104 and bearing 360 which all rotate together as a common assembly. In this particular embodiment wherein drive 100 includes 9 poles, it is noted that 12 permanent magnets 380 are employed although a greater or lesser number of poles and magnets may be employed in other embodiments if desired. A cover 385 is positioned over the drive assembly to protect the drive mechanism and to keep contaminants from entering the mechanism.

The foregoing has described a disk drive including a low profile disk mounting assembly which advantageously permits a vertically taller stator winding. In this manner, disk drive motor torque is increased without increasing the vertical dimension of the disk drive. A desirably low vertical profile disk drive is thus achieved.

While only certain preferred features of the invention have been shown by way of illustration, many modifications and changes will occur. For example, while a dynamic head loading type of disk drive is shown in the illustrations, it will be appreciated that the teachings herein can also be employed in contact start stop (CSS) disk drives. It is, therefore, to be understood that the present claims are intended to cover all such modifications and changes which fall within the true spirit of the invention.

What is claimed is:

1. A disk mounting assembly for a computer disk drive comprising:

a hub including an upper surface having a plurality of spoke recesses situated therein, the hub including a protruding ledge extending around the hub;

a disk including a central opening situated on the protruding ledge and about the hub;

a ring situated about the hub and atop the disk;

a spring washer including a circumferential edge surface situated atop the ring, the spring washer including a center and a plurality of spokes extending inwardly from the circumferential edge surface to the center, the plurality of spokes of the spring washer being situated within the respective plurality of spoke recesses of the hub; and a retainer for holding the center of the spring washer to the hub to squeeze the disk between the protruding ledge of the hub and the ring.

2. The disk mounting assembly of claim 1 wherein the hub includes a central threaded hub opening.

3. The disk mounting assembly of claim 2 wherein the spring washer includes a central washer opening.

4. The disk mounting assembly of claim 3 wherein the retainer comprises a screw which is inserted through the central washer opening and threaded into the central threaded hub opening, such that the screw and spring washer are below the upper surface of the hub.

5. The disk mounting assembly of claim 1 wherein the disk comprises a rigid disk.

6. The disk mounting assembly of claim 1 wherein the disk is selected from one of the group consisting of a magnetic disk, an optical disk and a CD ROM.

7. The disk mounting assembly of claim 1 wherein the hub includes a spindle centrally situated therein.

8. The disk mounting assembly of claim 1 wherein adjacent spokes are orthogonal.

9. The disk mounting assembly of claim 1 wherein adjacent spoke recesses are orthogonal.

10. A disk mounting assembly for a computer disk drive comprising:

a spring washer including a peripheral edge, a center region, and a plurality of spokes extending from the peripheral edge to the center region of the spring washer, the center region including a washer opening;

a hub including an upper surface having a plurality of spoke recesses for receiving the plurality of spokes therein, respectively, the hub including a side surface with a protruding ledge extending around the hub, the hub including a central threaded hole;

a disk including a central disk opening situated about the hub, the disk being situated on the protruding ledge of the hub; and a ring situated atop the disk and about the hub, the peripheral edge of the spring washer being situated atop the ring, the plurality of spokes of the spring washer being pulled into the plurality of spoke recesses of the hub, respectively, when a screw is inserted through the washer opening and threaded into the central threaded hole of the hub, so as to provide a holding force which squeezes the peripheral edge of the spring washer against the ring to hold the disk in place between the protruding ledge of the hub and the ring.

11. The disk mounting assembly of claim 10 wherein the disk comprises a rigid disk.

12. The disk mounting assembly of claim 10 wherein the disk is selected from one of the group consisting of a magnetic disk, an optical disk and a CD ROM.

13. The disk mounting assembly of claim 10 wherein the screw and spring washer are situated below the upper surface of the hub.

14. The disk mounting assembly of claim 10 wherein the hub includes a spindle centrally situated therein.

15. The disk mounting assembly of claim 10 wherein adjacent spokes are orthogonal.

16. The disk mounting assembly of claim 10 wherein adjacent spoke recesses are orthogonal.

17. A disk drive comprising:

a hub including an upper surface having a plurality of spoke recesses situated therein, the hub including a protruding ledge extending around the hub;

a disk including a central opening situated on the protruding ledge and about the hub, the disk including a media surface;

a ring situated about the hub and atop the disk;

a spring washer including a circumferential edge surface situated atop the ring, the spring washer including a center and a plurality of spokes extending inwardly from the circumferential edge surface to the center, the plurality of spokes of the spring washer being situated within the respective plurality of spoke recesses of the hub;

a retainer for holding the center of the spring washer to the hub to squeeze the disk between the protruding ledge of the hub and the ring;

a base member for rotatably supporting the hub;

a drive motor coupled to the hub to rotate the hub and disk when the disk drive is powered up;

an actuator arm pivotally supported about a center of rotation on the base member, the actuator arm including an end which is rotated in a plane substantially parallel with the media surface;

a slider body including a read/write recording element, the slider body being attached to the actuator arm for flight adjacent the media surface; and an actuator motor coupled to the actuator arm to position the recording element in a flying position adjacent the media surface when the disk drive is powered up and to position the recording element in a parked position removed from the disk when the disk drive is powered down.

18. The disk drive of claim 17 wherein the hub includes a central threaded hub opening.

19. The disk drive of claim 18 wherein the spring washer includes a central washer opening.

20. The disk drive of claim 19 wherein the retainer comprises a screw which is inserted through the central washer opening and threaded into the central threaded hub opening, such that the screw and spring washer are below the upper surface of the hub.

21. The disk drive of claim 17 wherein the disk comprises a rigid disk.

22. The disk drive of claim 17 wherein the disk is selected from one of the group consisting of a magnetic disk, an optical disk and a CD ROM.

23. The disk drive of claim 17 wherein the hub includes a spindle centrally situated therein.

24. The disk drive of claim 17 wherein adjacent spokes are orthogonal.

25. The disk drive of claim 17 wherein adjacent spoke recesses are orthogonal.

26. An assembly for mounting a disk in a disk drive, the assembly comprising:

a hub including an upper surface having a first groove situated therein, the hub including a protruding ledge extending around the hub;

a disk including a central opening situated on the protruding ledge about the hub a ring situated about the hub and a top the disk;

a spring washer including a circumferential edge surface situated atop the ring, the spring washer including a center and first and second spokes, each spoke extending inwardly from the circumferential edge surface to the center, the first and second spokes of the spring washer being situated to fit within the first groove of the hub; and a retainer for holding the center of the spring washer to the hub to squeeze the disk between the protruding ledge of the hub and the ring.

27. The assembly according to claim 26, wherein the hub includes a second groove in the upper surface, and wherein the spring washer includes third and fourth spokes, each extending inwardly from the circumferential edge to the center, the third and fourth spokes being adapted to fit within the second groove.

28. The assembly according to claim 27, wherein the first and second grooves are orthogonal.

29. The assembly according to claim 27, wherein the hub includes a threaded opening.

30. The assembly according to claim 29, wherein the retainer comprises a threaded screw.

31. The assembly according to claim 26, wherein the ring includes a groove, and wherein a portion of the circumferential edge surface of the spring washer contacts a portion of the groove when the assembly is assembled to support a disk.

32. A disk mounting assembly for a computer disk drive, comprising in operative combination:
 a hub including an upper surface having a plurality of spoke recesses situated therein, the hub including a protruding ledge extending around the hub;
 a disk including a central opening situated on the protruding ledge and about the hub;
 a ring situated about the hub and atop the disk;
 a spring washer including a circumferential edge surface situated atop the ring, the spring washer including a center, and a plurality of spokes extending inwardly from the circumferential edge surface to the center, the plurality of spokes of the spring being disposed within the respective plurality of spoke recesses in the hub such that the ring and spring washer do not extend beyond the upper surface of the hub; and
 a retainer for holding the center of the spring washer to the hub to squeeze the disk between the protruding ledge of the hub and the ring.

33. A disk drive, comprising in operative combination:
 a hub including an upper surface having a plurality of spoke recesses disposed therein, the hub including a protruding ledge extending around the hub;
 a disk including a central opening situated on the protruding ledge and about the hub, the disk including a media surface;
 a ring situated about the hub and atop the disk;
 a spring washer including a circumferential edge surface situated atop the ring, the spring washer including a center and a plurality of spokes extending inwardly from the circumferential edge surface to the center, the plurality of spokes of the spring washer being disposed within the respective plurality of spoke recesses of the hub such that the ring and spring washer do not extend beyond the upper surface of the hub to provide a low profile mounting assembly;
 a retainer for holding the center of the spring washer to the hub to squeeze the disk between the protruding ledge of the hub and the ring;
 a base member for rotatably supporting the hub;
 a drive motor coupled to the hub to rotate the hub and disk when the disk drive is powered up;
 an actuator arm pivotally supported about a center of rotation on the base member, the actuator arm including an end which is rotated in a plane substantially parallel with the media surface;
 a slider body including a read/write recording element, the slider body being attached to the actuator arm for flight adjacent the media surface; and
 an actuator motor coupled to the actuator arm to position the recording element in a flying position adjacent the media surface when the disk drive is powered up, and to position the recording element in a parked position when the disk drive is powered down.

* * * * *